United States Patent
Akiyama et al.

(10) Patent No.: US 8,248,887 B2
(45) Date of Patent: Aug. 21, 2012

(54) PHYSICAL OBJECT DETECTION SYSTEM

(75) Inventors: Keiko Akiyama, Kariya (JP); Mitsuyasu Matsuura, Chiryu (JP); Toshiki Isogai, Nagoya (JP); Takahiko Yoshida, Okazaki (JP); Yasuyuki Okuda, Aichi-gun (JP)

(73) Assignees: Nippon Soken, Inc., Nishio (JP); DENSO CORPORATION, Kariya (JP)

(*) Notice: Subject to any disclaimer, the term of this patent is extended or adjusted under 35 U.S.C. 154(b) by 294 days.

(21) Appl. No.: 12/656,663

(22) Filed: Feb. 12, 2010

(65) Prior Publication Data

US 2010/0220551 A1    Sep. 2, 2010

(30) Foreign Application Priority Data

Feb. 27, 2009    (JP) .................................. 2009-45617

(51) Int. Cl.
*G01S 15/93* (2006.01)
(52) U.S. Cl. ........................................................ 367/98
(58) Field of Classification Search .................... 367/98, 367/99, 105, 902
See application file for complete search history.

(56) References Cited

U.S. PATENT DOCUMENTS

| | | | |
|---|---|---|---|
| 5,627,511 A | 5/1997 | Takagi et al. | |
| 2010/0220551 A1* | 9/2010 | Akiyama et al. | 367/99 |

FOREIGN PATENT DOCUMENTS

| | | |
|---|---|---|
| JP | A-2-300684 | 12/1990 |
| JP | A-6-138226 | 5/1994 |
| JP | A-2001-202592 | 7/2001 |
| JP | A-2005-70943 | 3/2005 |
| JP | A-2007-127503 | 5/2007 |
| JP | 2010197342 A * | 9/2010 |

OTHER PUBLICATIONS

Office Action mailed on Feb. 15, 2011 in corresponding Japanese Patent Application No. 2009-45617 (English translation enclosed).

* cited by examiner

*Primary Examiner* — Daniel Pihulic

(57) ABSTRACT

In an obstacle detection system, a wave transmitted by a transmitting element and received by receiving elements as a receiving wave includes extraneous waves, which are reflection waves from other than an obstacle, and obstacle reflection waves from an obstacle. It is determined that, an obstacle is present, if the reflection waves are detected as having an amplitude (voltage) greater than a threshold level and a reception time difference between time points at which the amplitude exceeds threshold level at the receiving elements is less than a predetermined time.

9 Claims, 13 Drawing Sheets

US 8,248,887 B2

PHYSICAL OBJECT DETECTION SYSTEM

CROSS REFERENCE TO RELATED APPLICATION

This application is based on and incorporates herein by reference Japanese Patent Application No. 2009-45617 filed on Feb. 27, 2009.

FIELD OF THE INVENTION

The present invention relates to a physical object detection system for detecting a physical object based on a phase difference between a transmission wave transmitted by a transmitter and a reflection wave corresponding to the transmission wave reflected by a physical object.

As one of conventional physical object detection system, JP 2005-70943A discloses one exemplary system. This system executes a total of eight times of calculations of distance and angle relative to an obstacle and storage of the calculated data in a memory, when a reflection wave from an obstacle is detected. The system then determines that the detected obstacle is an irregular reflection physical object, if the difference between the maximum value and the minimum value of the distances stored in the memory is equal to or greater than 5 cm. The system also determines that the detected obstacle is an irregular reflection physical object, if the difference between the maximum value and the minimum value of the angles stored in the memory is equal to or greater than 40°.

The system further checks the latest distance after the eight-time calculations, and determines that the obstacle has been avoided or touched if the latest distance is greater and equal to or less than an irregular reflection determination distance, respectively. The system however does not compare the latest distance with an irregular reflection determination distance, if the difference between the maximum value and the minimum value of the distance is less than 5 cm and the difference of the angle between the maximum value and the minimum value is less than 40°. In this instance, the system determines whether the obstacle has been touched or avoided by comparing the detected position of the obstacle and the touch determination line.

According to the conventional system, it cannot be determined that an obstacle is present unless transmission of the transmission wave and reception of the reflection wave are repeated a plurality of times to calculate the distance and the angle to the physical object, and the distance and the angle relative to the physical object must be calculated. Therefore, the response of the system from the transmission of the transmission wave to the determination of the presence of the obstacle is not satisfactory.

SUMMARY OF THE INVENTION

It is therefore an object of the present invention to realize a physical object detection system, which has improved response from transmission of a transmission wave to determination of presence of a physical object.

According to one aspect of the present invention, a physical object detection system has at least one transmitting element for transmitting a transmission wave, at least two receiving elements for receiving a reflection wave, which corresponds to the transmission wave reflected by a physical object, and an electronic unit for detecting presence of the physical object based on a phase difference between the reflection waves received by the receiving elements. The electronic unit includes a detection section and a determination section. The detection section is configured to detect a set of waves, each of which is a part of the reflection wave received by each of the receiving elements and has an amplitude greater than a predetermined level, a time difference between time points at which the amplitudes of the set of waves exceed the predetermined level is less than a predetermined time interval. The determination section is configured to determine presence of the physical object when the set of waves are detected between the receiving elements.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in more detail with reference to a variety of embodiments, in which a physical object detection system is implemented exemplarily in an ultrasonic sensor provided in a vehicle for detecting an obstacle, which is a physical object.

First Embodiment

Figure 1:
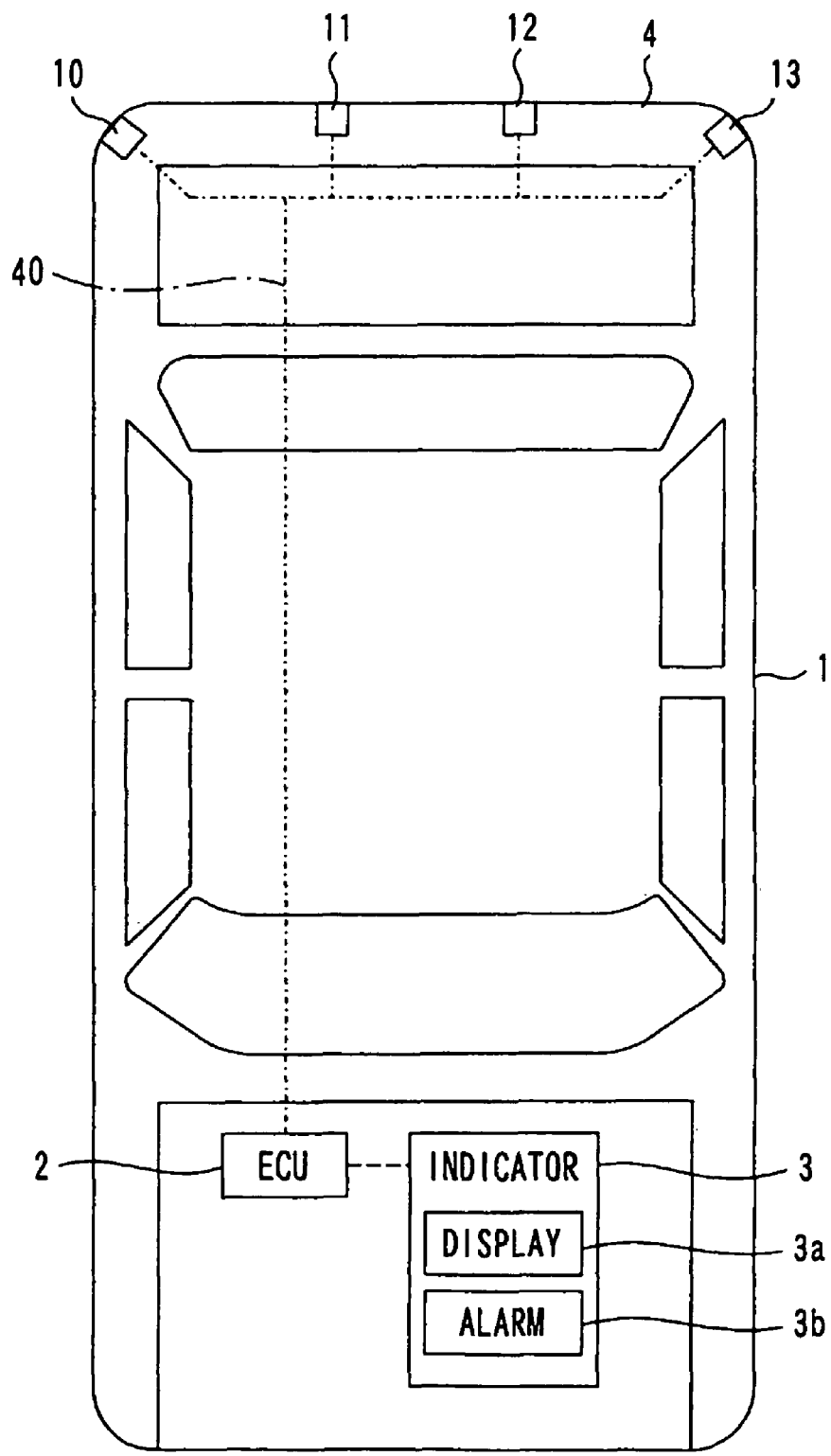
FIG. 1 is a schematic view showing a physical object detection system according to a first embodiment of the present invention.

Referring to FIG. 1, four ultrasonic sensors 10 to 13 are attached to a rear bumper 4 of a vehicle 1. Each ultrasonic sensor 10 to 13 is configured to transmit an ultrasonic wave and detect an obstacle, which is present in the direct or oblique rear part of the vehicle, based on a reflection wave of the transmitted ultrasonic wave. The ultrasonic sensors 10 to 13 are arranged along the rear bumper 4. More specifically, two ultrasonic sensors 11 and 12 are arranged on a linear part of the rear bumper 4. The other two ultrasonic sensors 10 and 13 are arranged at two rear corners of the rear bumper 4, respectively.

In the vehicle 1, an electronic control unit (ECU) 2 is provided and connected to the ultrasonic sensors 10 to 13. The ECU 2 and the ultrasonic sensors 10 to 13 are connected to be capable of communications bilaterally through a local area network (LAN) cable 40. An indicator device 3 is connected to the ECU 2 for indicating a distance relative to an obstacle by sound or visual display.

The ECU 2 is configured to generate a transmission instruction and a reception instruction to each ultrasonic sensor 10 to 13 through the LAN cable 40. The transmission instruction is for instructing transmission of a transmission wave (ultrasonic wave), and the reception instruction is for instructing reception of a reflection wave (ultrasonic wave). The ECU 2 is further configured to control the indicator device 3 based on the information indicating the position of an obstacle acquired from the ultrasonic sensors 10 to 13 through the LAN cable 40. The indicator device 3 includes a display part 3a and an alarm part 3b. The display part 3a visually displays the distance from the rear bumper 4 to the obstacle by a liquid crystal display (LCD) or a light emitting diode display (LED). The alarm part 3b generates sound by a speaker or the like.

Figure 2A:
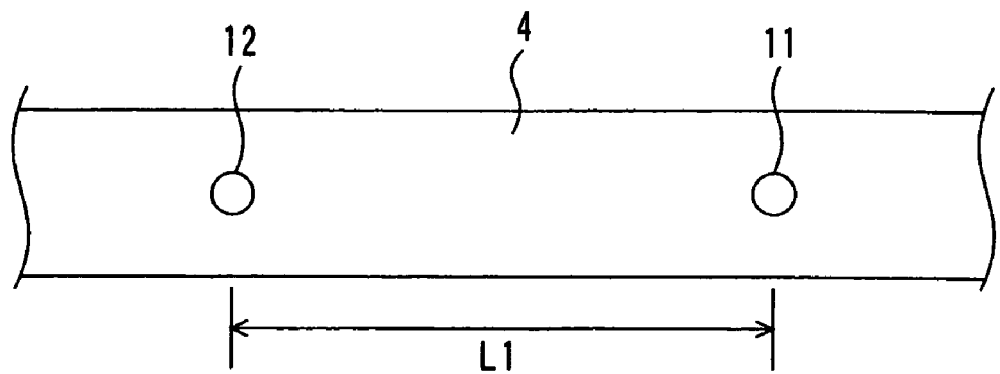
FIGS. 2A and 2B are front views showing a rear bumper and an ultrasonic sensor in the first embodiment.
Figure 2B:
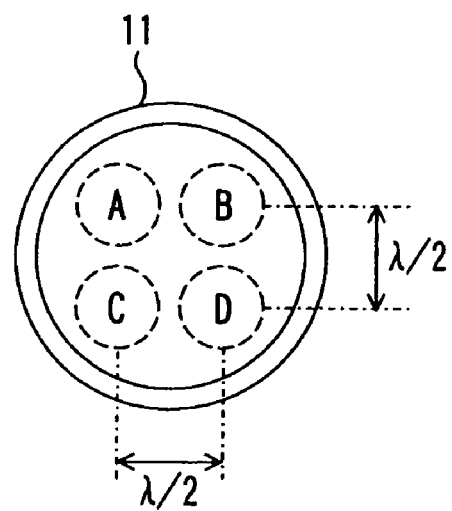

As shown in FIG. 2A, each ultrasonic sensor 10 to 13 is arranged in the bumper 4 and spaced apart from the adjacent ultrasonic sensor a predetermined distance L1. The ultrasonic sensors 10 to 13 are arranged in parallel to a fixed surface such as a road surface, on which a vehicle travels. The ultrasonic sensors 10 to 13 have the same configuration. The ultrasonic sensor 11 is shown in FIG. 2B as an example. The ultrasonic sensor 11 has a transmitting element A for transmitting an ultrasonic wave and receiving elements B, C and D for receiving a reflection wave as reflection of the transmission wave by an obstacle.

The transmitting element A and the receiving element B are arranged in an array form and spaced apart from each other a half wavelength ($\lambda/2$) of the wavelength $\lambda$ of the transmission wave horizontally (same direction as the arrangement of the ultrasonic sensors). The receiving elements C and D are also arranged in the array form and spaced apart from each other the same interval as the elements A and B horizontally (same direction as the arrangement of the ultrasonic sensors).

The receiving elements C and D are positioned right below the transmitting element A and the receiving element B, respectively. The transmitting element A and the receiving element C are arranged in the array form and spaced apart from each other the half wavelength ($\lambda/2$) vertically (perpendicular direction relative to the direction, of arrangement of the ultrasonic sensors). The receiving elements B and D are also arranged in the array form and spaced apart from each other the same interval as the transmitting element A and the receiving element C vertically (perpendicular direction relative to the direction of arrangement of the ultrasonic sensors). A line (not shown) connecting the centers of the elements A and B is in parallel to a line (not shown) connecting the centers of the elements C and D. Further, a line (not shown) connecting the centers of the elements A and C is also in parallel to a line (not shown) connecting the centers of the elements B and D. As described above, the elements A to D are arranged in a square shape having one side parallel to the road surface, on which a vehicle travels.

Each element A to D has a piezoelectric vibrator and an acoustic matching layer. The transmitting element A corresponds to an ultrasonic wave speaker, which transmits a transmission wave by applying a voltage to the piezoelectric vibrator to vibrate the piezoelectric vibrator by electrostriction effect. Each receiving element B, C and D corresponds to an ultrasonic microphone. The reflection wave of the transmission wave reflected by an obstacle or the like is transmitted to the piezoelectric vibrator of the receiving element. The reflection wave is detected based on a voltage produced by the piezoelectric vibrator by piezoelectric effect caused when the piezoelectric vibrator is distorted. The vibrator may be a capacitive type.

The main electric configuration of each ultrasonic sensor will be described next.

Figure 3:
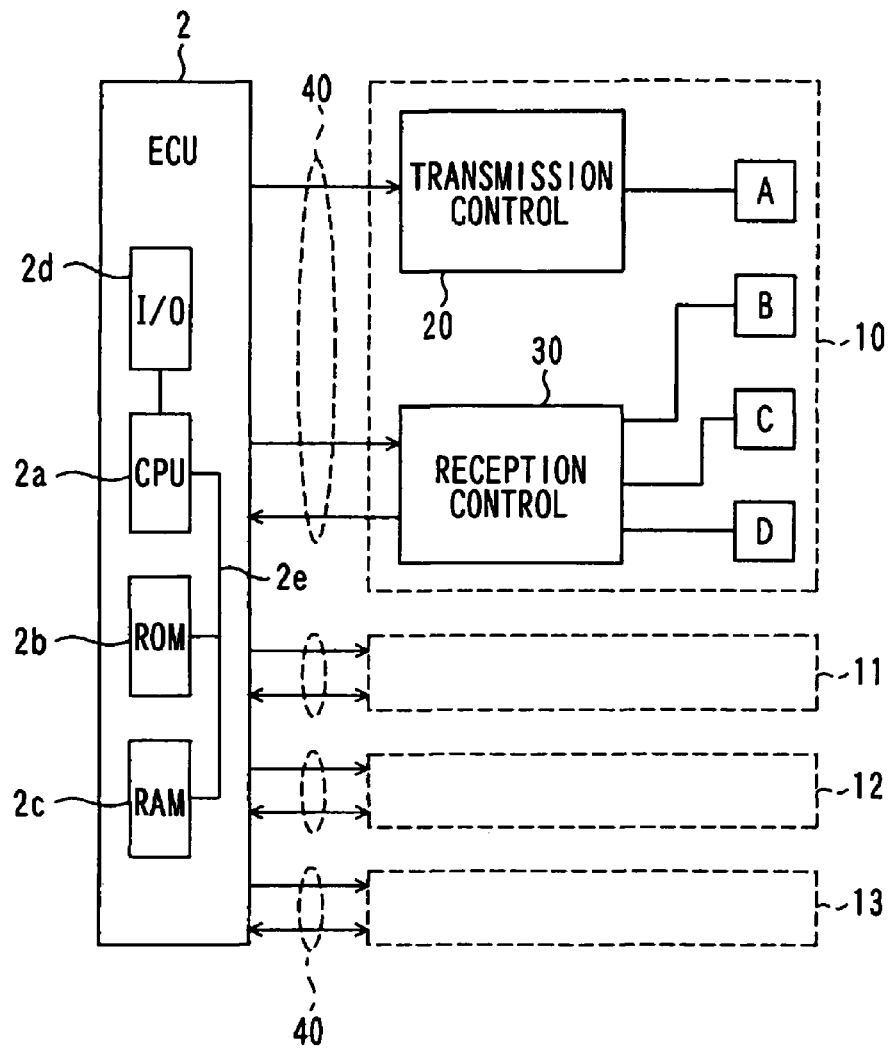
FIG. 3 is a block diagram schematically showing electric configuration of each ultrasonic sensor.

As shown in FIG. 3, in each ultrasonic sensor 10 to 13, a transmission control section 20 and a reception control section 30 are connected to the ECU 2 through the LAN cable 40.

The ECU 2 is a computer including a CPU 2a, a ROM 2b, a RAM 2c, an I/O 2d and a bus 2e connecting these components. The CPU 2a is programmed to instruct the transmitting element A of each ultrasonic sensor to transmit the transmission wave and instruct the receiving element B to D of each ultrasonic sensor to receive the reflection wave. For example, the transmission of the transmission wave is instructed first to the ultrasonic sensor 10, which is positioned at one end of the arrangement of sensors, followed by the ultrasonic sensors 11 to 13 in sequence. After completing instruction of transmission of the transmission wave to the ultrasonic sensor 13, which is positioned at the other end of the arrangement of sensors, the transmission of the transmission wave is instructed first to the ultrasonic sensor 13 followed by the ultrasonic sensors 12 to 10 in the reverse or backward sequence.

However, after instructing the transmission of the transmission wave first to the ultrasonic sensor at one end and last to the ultrasonic sensor at the other end, the transmission of the transmission wave may be started again in the same sequence. That is, the transmission instruction may be repeated in the same order. The ultrasonic sensor, which is instructed first to transmit the ultrasonic wave, is not limited to the ultrasonic sensor, positioned at the end of the arrangement of sensors.

Thus, the CPU 2a instructs each ultrasonic sensor to detect an obstacle by ultrasonic wave scanning. The direction of scanning may a back-and-forth direction or a single fixed direction. The order of instruction of transmission of the transmission wave may be at random or irregular.

The instruction of reception of the reflection wave may be made at the same time as the instruction of transmission of the transmission wave or persistently.

The CPU 2a is programmed to instruct each reception control section 30 to transmit in return position information about the detected obstacle (information about the distance to the obstacle and the direction to the obstacle). The CPU 2a is programmed to drive the indicator device 3 based on the received position information. For example, the indicator device 3 is configured to display the position of the obstacle on the display part 3a and generate a sound varying with the distance to the obstacle by the alarm part 3b. For example, the sound may be turned up or the tone may be changed as the detected distance becomes shorter.

The transmission control section 20 is configured to generate a transmission signal based on the transmission instruction of the ECU 2 and output it to the transmitting element A.

Figure 4:
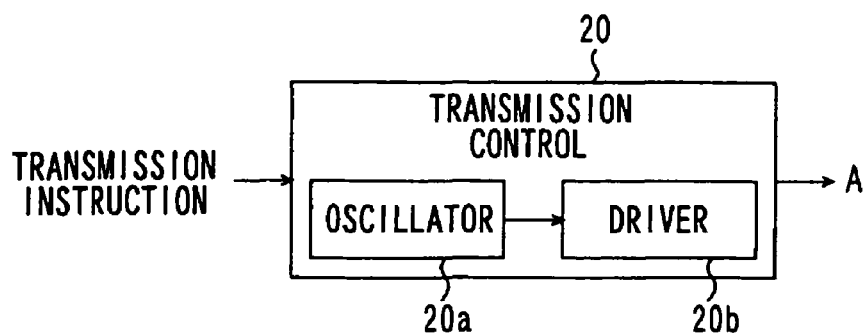
FIG. 4 is a block diagram schematically showing a transmission control section shown in FIG. 3.

The transmission control section 20 shown in FIG. 3 is configured as shown in FIG. 4. The transmission control section 20 includes an oscillator circuit 20a and a driver circuit 20b.

The oscillator circuit 20a is configured to generate a sinusoidal wave of a predetermined frequency in a predetermined ultrasonic wave region in response to a transmission timing signal (transmission instruction) from the ECU 2, and output to the driver circuit 20b a pulse signal, which results from pulse modulation of the sinusoidal wave. The driver circuit 20b is configured to operate with a power source voltage applied to the transmitting element A and drive the piezoelectric vibrator of the transmitting element A by the pulse signal (drive signal) of the oscillator circuit 20a. The piezoelectric vibrator of the transmitting element A is thus driven to vibrate to transmit the transmission wave (ultrasonic wave) from the transmitting element A externally from the vehicle.

As long as the transmission timing signal is outputted from the ECU 2 to the transmission control section 20, the transmission control section 20 and the transmitting element A are connected electrically so that the ultrasonic wave is transmitted from the transmitting element A to the outside of the vehicle.

Figure 5:
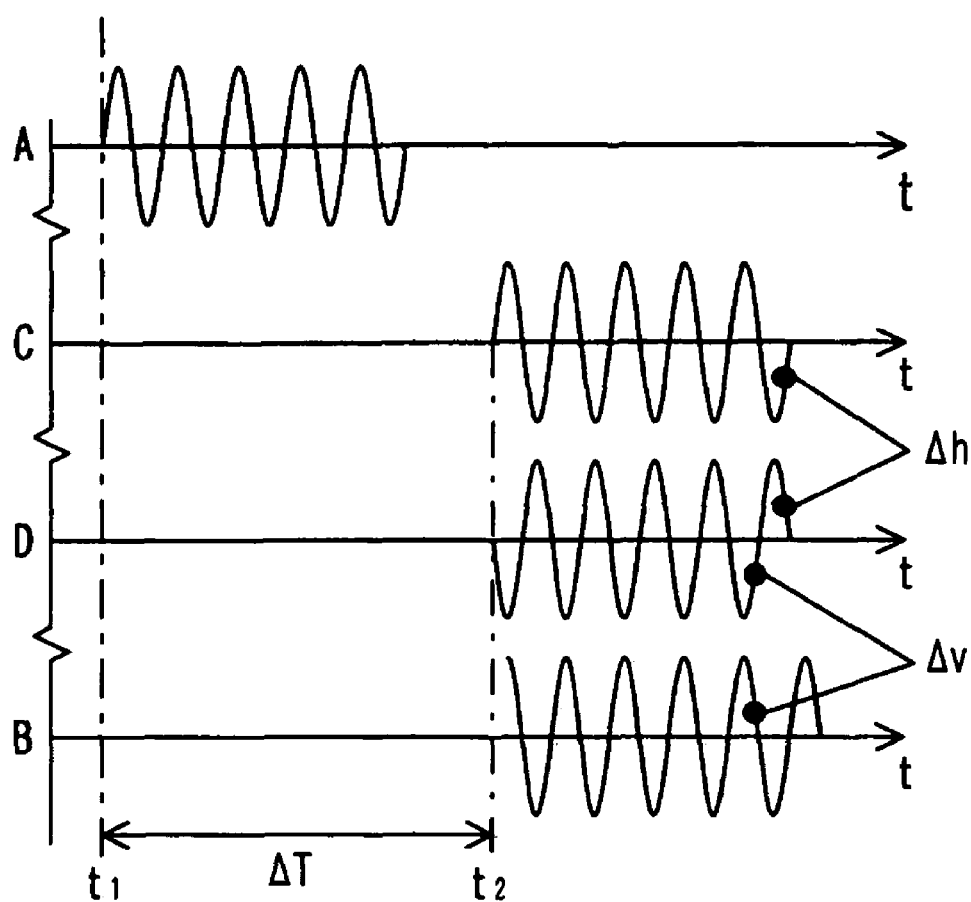
FIG. 5 is an explanatory diagram showing detection of an obstacle position.

As shown in FIG. 5, the distance to an obstacle is detected based on a time difference $\Delta T$ between time point t1 the transmission wave is transmitted by the transmitting element A and time point t2 the reflection wave is received by the receiving elements B to D. The horizontal direction (orientation) toward the obstacle is detected based on a phase difference $\Delta h$ between the reflection waves received by the receiving elements. C and D arranged in the horizontal direction. The vertical direction (orientation) toward the obstacle is detected based on a phase difference $\Delta v$ between the reflection waves received by the receiving elements B and D arranged in the vertical direction.

Figure 6:
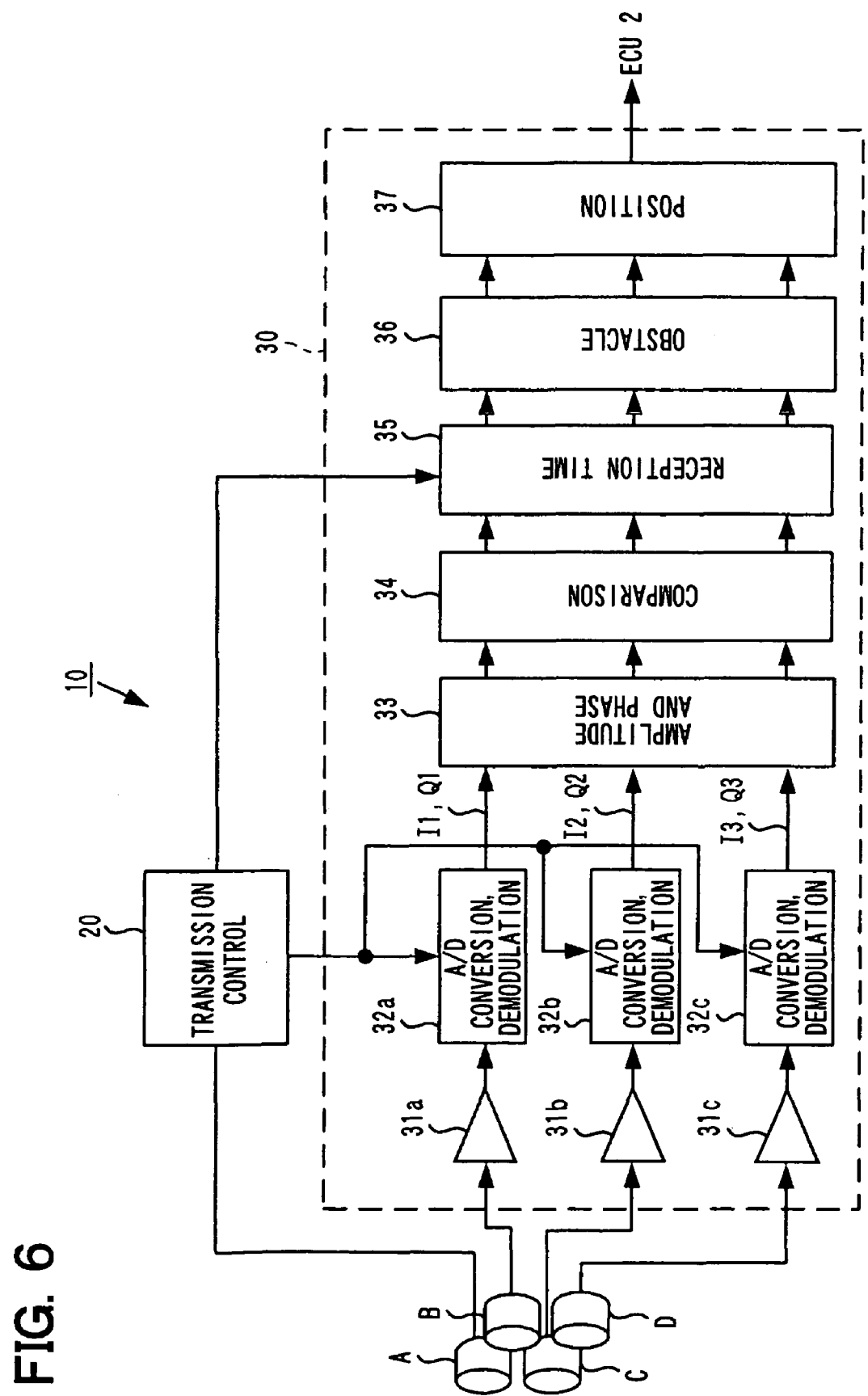
FIG. 6 is a block diagram schematically showing a reception control section shown in FIG. 3.
Figure 8:
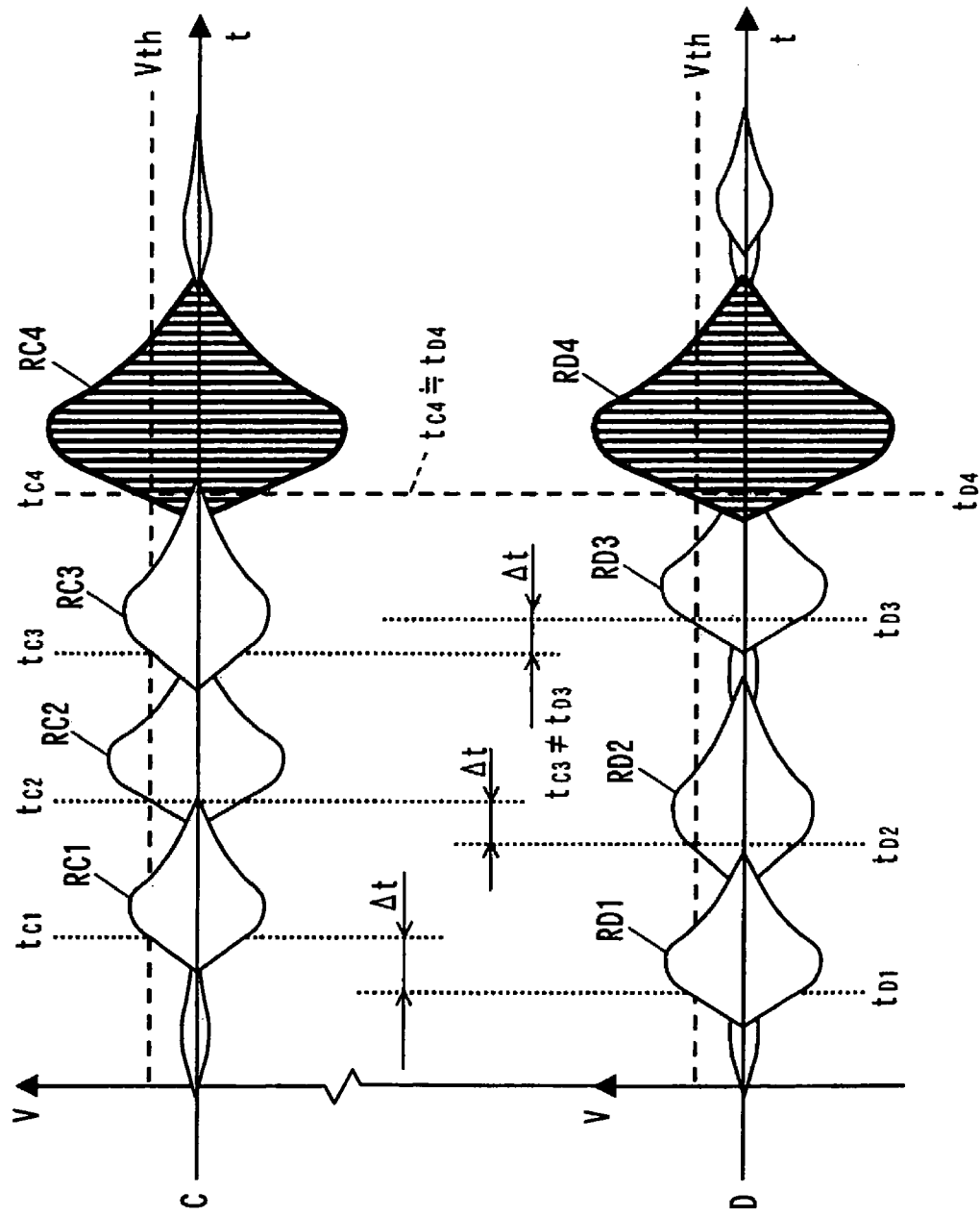
FIG. 8 is an explanatory diagram showing one example of a reflection wave of receiving elements C and D.

The reception control section 30 shown in FIG. 3 is configured as shown in FIG. 6. One example of the reception wave of the receiving elements C and D are shown in FIG. 8. The reception control section 30 is configured to check whether output signals produced by the receiving elements B, C and D results from reflection waves of an obstacle, and calculate the position of the obstacle based on the reflection waves if the signals are determined to correspond to the reflection waves.

The reception control section 30 includes amplifiers 31a to 31c connected to the receiving elements B to D, respectively, A/D conversion and quadrature demodulation sections (orthogonal demodulation section) 32a to 32c, an amplitude and phase calculation section 33, a comparison section 34, a reception time detection section 35, an obstacle determination section 36 and a position calculation section 37.

The amplifiers 31a to 31c amplify the output signals of the receiving elements B to D by a predetermined gain, respectively. The A/D conversion and quadrature demodulation sections 32a to 32c convert the signals produced by the amplifiers 31a to 31c to corresponding digital signals and demodulate the digital signals orthogonally.

More specifically, the A/D conversion and quadrature demodulation section 32a multiplies the digital signal by sine wave and a cosine wave of predetermined frequencies, and filters out high frequency components from the multiplication-resulting signal by a low-pass filter to extract an inphase component I1 and a quadrature component Q1. Similarly, the ND conversion and quadrature demodulation section 32b multiplies the digital signal by sine wave and a cosine wave of predetermined frequencies, and filters out high frequency components from the multiplication-resulting signal by a low-pass filter to extract an inphase component I2 and a quadrature component Q2.

In addition, the A/D conversion and quadrature demodulation section 32c multiplies the digital signal by sine wave and a cosine wave of predetermined frequencies, and filters out high frequency components from the multiplication-resulting signal by a low-pass filter to extract an inphase component I3 and a quadrature component Q3.

Figure 7:
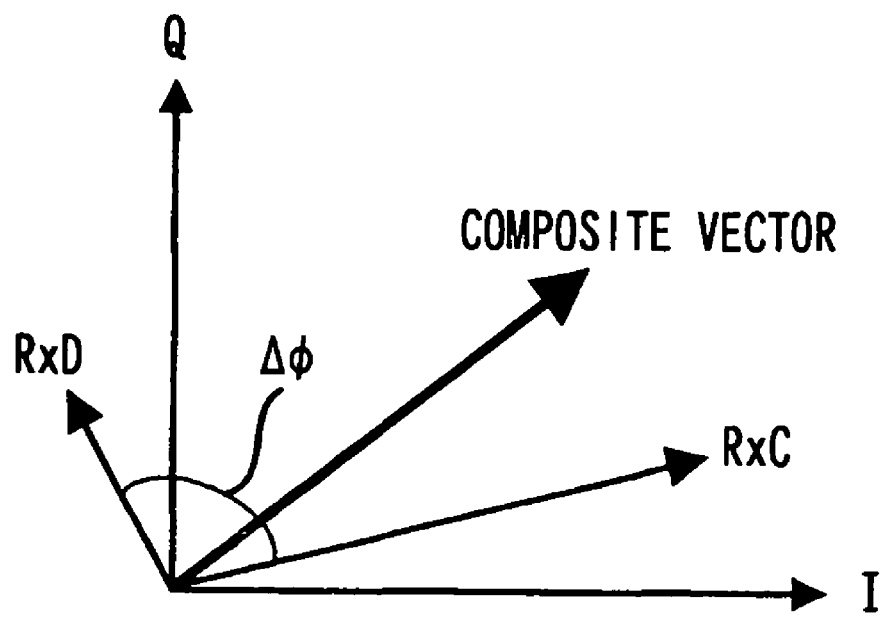
FIG. 7 is a diagram showing quadrature demodulation signals of receiving elements C and D on a complex plane (IQ plane) in case of a phase difference $\Delta\phi$.

FIG. 7 shows the quadrature demodulation signals of the receiving elements C and D on a complex plane (I-Q plane). The quadrature demodulation signals have a phase difference $\Delta\phi$ therebetween. If the reception signals received by the receiving elements C and D are quadrature-demodulated, each demodulation signal is separated into signals of the inphase component (I) and the quadrature component (Q) relative to the sine wave of the predetermined frequency.

This is represented as a vector of a predetermined amplitude and a predetermined phase on the I-Q plane (complex plane) defined by axes of an inphase component (I) and a quadrature component (Q). The demodulation signals of the receiving elements C and D differ in phase each other in accordance with the direction of an obstacle. The demodulation signals (RxC and RxD) of the elements C and D are represented on the I-Q plane as having the phase difference $\Delta\phi$ as shown in FIG. 7. The phase difference is variable with the direction of the obstacle.

The amplitude and phase calculation section 33 calculates the amplitude and the phase of the reflection wave, which is received by the receiving element B, by using the inphase component I1 and the quadrature component Q1 determined by the ND conversion and quadrature demodulation section 32a. The amplitude and phase calculation section 33 also calculates the amplitude and the phase of the reflection wave, which is received by the receiving element C, by using the inphase component I2 and the quadrature component Q2 determined by the ND conversion and quadrature demodulation section 32b. The amplitude and phase calculation section 33 further calculates the amplitude and the phase of the reflection wave, which is received by the receiving element D, by using the inphase component I3 and the quadrature component Q3 determined by the A/D conversion and quadrature demodulation section 32c.

It was found by the inventors that the waveform of a reflection wave received from an obstacle is generally the same among a plurality of receiving elements, but the waveform of a reflection wave received from other irregular (diffuse) reflection parts such as road surfaces, trees and net structures differ from receiving element to receiving element provided at different positions. This is because the irregular reflection body has a plurality of reflection points and a number of reflection waves are combined and interfere one another. For this reason, it can be determined that no obstacle is present if the difference in time (reception time difference), at which the amplitude of the reflection wave exceeds a predetermined threshold level, among the receiving elements exceeds a predetermined time interval. If the reception time difference does not exceed the predetermined threshold, it can be determined that an obstacle is present.

The comparison section 34 is configured to check whether the amplitude V of each reflection wave calculated by the amplitude and phase calculation section 33 is equal to or greater than a predetermined level Vth. In FIG. 8, the axis of ordinate represents a voltage corresponding to an amplitude V and the axis of abscissa represents time t. In an example shown in FIG. 8, the reflection wave and hence the reception wave of the receiving element C includes extraneous waves RC1 to RC3, which result from reflection by other than an obstacle, as well as an obstacle reflection wave RC4, which results from reflection by the obstacle. Similarly, the reception wave of the receiving element D includes extraneous waves RD1 to RD3 and obstacle reflection wave RD4.

The comparison section 34 compares the voltage (amplitude) V of each reception wave with the predetermined threshold level Vth thereby to check whether the former is equal to or greater than the latter. The wave having the amplitude exceeding the threshold level Vth is likely to be the reflection wave from the obstacle. The wave having the amplitude not exceeding the threshold level Vth is likely to be not the reflection wave from the obstacle. Thus, the comparison section 34 determines possibility of the reflection wave from the obstacle based on whether the amplitude is equal to or greater than the threshold level Vth. The comparison section 34 outputs a determination result data indicative of its comparison result to a reception time detection section.

The reception time detection section 35 is configured to detect time interval required from time of transmission of the transmission wave from the transmitting element A to time, at which the amplitude V of a predetermined one of the reception waves of the receiving elements B to D exceeds the predetermined threshold level Vth. The reception time detection section 35 outputs a reception time data indicative of the detected reception time interval. In this embodiment, the time interval detected by the reception time detection section 35 is used as the time interval of receiving the reflection wave by the receiving element.

The obstacle determination section 36 is configured to determine whether an obstacle is present based on the reception time data received from the reception time detection section 35. The obstacle determination section 36 calculates, with respect to each set of corresponding reflection waves of the receiving elements C and D, a time difference $\Delta t$ between reception time points by referring to the reception time data of the set of corresponding reflection waves of the receiving elements C and D. It is checked whether the calculated time difference $\Delta t$ is less than a predetermined time interval ta.

In this embodiment, the predetermine time interval ta is set to a value, which is a product (multiplication result) of the sound velocity and one-half wavelength $\lambda/2$ of the transmission wave, which is equal to the spacing or positional interval between the receiving elements C and D. Specifically, if the time difference $\Delta t$ is less than the predetermined time interval ta, the set of corresponding reflection waves are likely to result from reflection by an obstacle. If the time difference $\Delta t$ is greater than the predetermined time interval ta, the set of corresponding reflection waves are likely to result from bodies such as a road surface other than an obstacle. Therefore, the obstacle determination section 36 determines that an obstacle is present when a set of corresponding reflection waves of calculated time difference $\Delta t$ less than the predetermined time interval ta are detected. That is, the obstacle determination section 36 determines that it is not an obstacle but an irregular reflection body, which reflects irregularly the transmission wave, when the set of reflection waves having the time difference $\Delta t$ exceeding the predetermined time interval ta are detected.

In FIG. 8, for example, the extraneous waves RC1 and RD1 are a set of corresponding waves between reception waves of the receiving elements C and D. Time points of reception of the extraneous waves RC1 and RD1 are tC1 and tD1, respectively, and different from each other. The time difference $\Delta t$ (=tD1−tC1) between the reception time points is greater than the predetermined time interval ta. Therefore, it is not so determined, based on the set of the corresponding extraneous waves RC1 and RD1, that an obstacle is present. The same determination is also made with respect to the set of extraneous waves RC2 and RD2 and the set of extraneous waves RC3 and RD3.

The next time difference $\Delta t$ (=tD4−tC4) between the reception time points of the obstacle reflection waves RC4 and RD4 is less than the predetermined time interval ta. It is therefore determined, based on the set of the obstacle reflection waves RC4 and RD4, that an obstacle is present. The presence of an obstacle may also be determined, if a distance difference $\Delta x$, which is calculated by, multiplying the reception time difference by the sound velocity (propagation speed of ultrasonic wave), is less than a predetermined distance difference d.

The position calculation section 37 is configured to detect the position of an obstacle (distance and direction of the obstacle from the ultrasonic sensor 10). The position of the obstacle is calculated based on the set of waves, which are used to determine the presence of the obstacle in the obstacle determination section 36. The distance from the ultrasonic sensor to the obstacle is calculated by multiplying a time interval tc4 by the propagation speed of the transmission wave. The time interval tc4 is from a time point, at which the transmission wave is transmitted from the transmitting element A, until a time point, at which the reception wave of a reference receiving element, for example, of the receiving element C, the receiving element, is greater than the amplitude of the wave determined as an obstacle exceeds a predetermined threshold level Vth.

The position calculation section 37 is also configured to calculate the horizontal direction based on the phase difference between the demodulation signals of the receiving elements C and D at a time point at which the amplitude of the wave in the reception wave of the receiving element C as a reference element exceeds the predetermined threshold level. The position calculation section 37 is further configured to calculate, as a phase difference vector (phase difference vector indicating the horizontal direction) indicating the amplitude of the reception signal, the phase difference between the reception signals of the receiving elements C and D, in a plurality sample points following the time point at which the amplitude of the wave (corresponding to the obstacle) in the reception wave of the receiving element C exceeds the predetermined threshold level.

The position calculation section 37 is further configured to calculate the vertical direction toward the physical object based on the inphase components I1, I3 and the quadrature components Q1, Q3, which the A/D conversion and quadrature demodulation sections 32a, 32c has calculated with respect to the set of corresponding waves, by which the obstacle determination section 36 detects the obstacle. Specifically, the position calculation section 37 receives the phases of the inphase component I1 and the quadrature component Q1, which are quadrature-demodulated by the A/D conversion and quadrature demodulation section 32a, and the phases of the inphase component I3 and the quadrature component Q3, which are quadrature-demodulated by the A/D conversion and quadrature demodulation section 32c. The position calculation section 37 calculates the phase difference between the calculated phases and calculates the vertical direction.

The position calculation section 37 is further configured to calculate the vertical direction based on the phase difference between the demodulation signals of the receiving elements B and D at a time point at which the amplitude of the wave in the reception wave of the receiving element C as a reference element exceeds the predetermined threshold level. The position calculation section 37 is further configured to calculate, as a phase difference vector (phase difference vector indicating the vertical direction) indicating the amplitude of the reception signal, the phase difference between the reception signals of the receiving elements B and D, in a plurality of sample points following the time point at which the amplitude of the wave (corresponding to the obstacle) in the reception wave of the receiving element C exceeds the predetermined threshold level.

Figure 9:
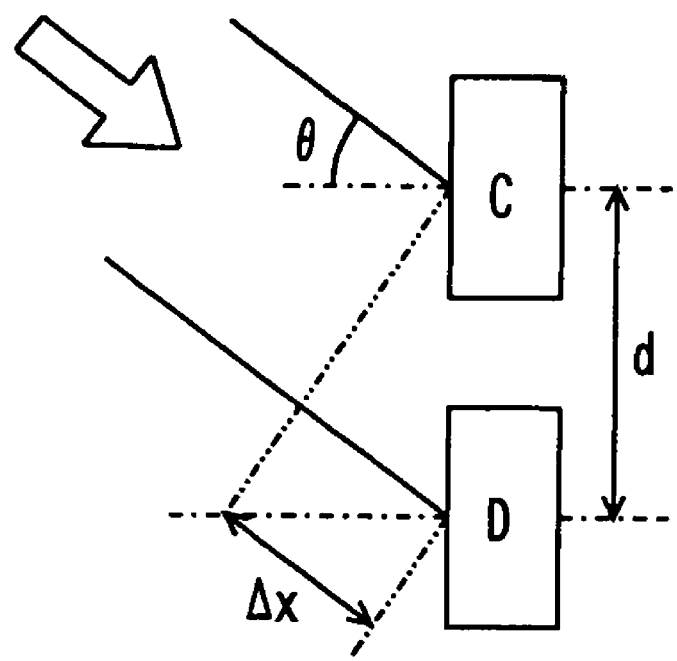
FIG. 9 is an explanatory diagram showing a reflection wave incoming with an angle $\theta$ to receiving elements C and D spaced apart a distance d.

FIG. 9 exemplarily shows a reflection wave arriving at the receiving elements C and D, which are spaced apart a distance d, at an angle θ relative to the center axes of the receiving elements C and D. The arrival direction (angle) θ of the reflection wave is expressed as follows, in which d represents a distance between the receiving elements C and D, Δφ represents the phase difference between the demodulation signals, and λ represents the wavelength of the reflection wave.

$$\theta = \sin^{-1}(\Delta\phi \times \lambda/(2\pi \times d)) \quad (1)$$

The arrival direction θ can be calculated by substituting the wavelength λ of the reflection wave (same as that of the transmission wave), the distance d (=λ/2) between two elements and the phase difference Δφ of the demodulation signal into the equation (1). For calculating the phase difference Δφ of the demodulation signal, a phase difference vector Def indicating a phase difference of each demodulation signal is calculated at a plurality of sample points after the time point, at which the amplitude of the wave (obstacle reflection wave) among the reception waveform of the receiving element C as a reference element exceeds the predetermined threshold level. The phase difference vector Def represents the amplitude of the reception signal and calculated as follows.

$$Def = X \times Y \times \exp(j(\phi 1 - \phi 2)) = X \times Y \times \exp(j(\Delta\phi)) \quad (2)$$

Figure 10A:
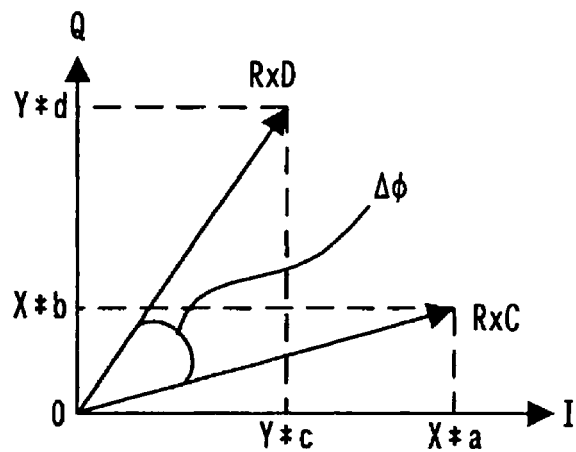
FIGS. 10A to 10C are explanatory diagrams showing calculation of a phase difference of a receiving signal of each element by addition of a phase difference vector at a plurality of sample points.
Figure 10B:
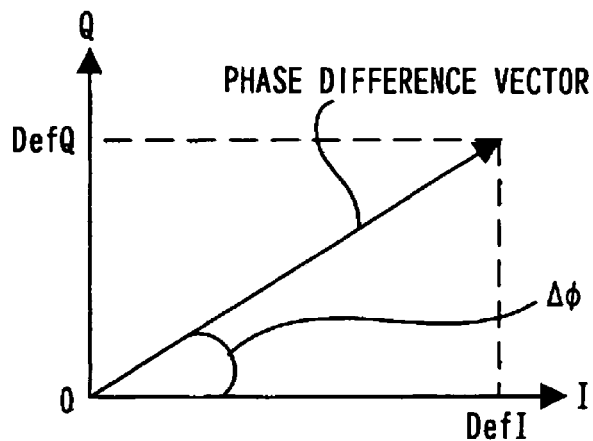
Figure 10C:
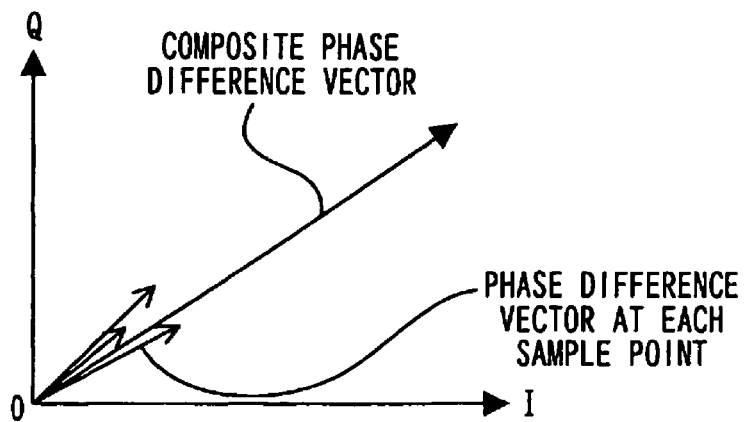

X and Y indicate intensity or amplitude of each demodulation, signal, and φ1 and φ2 indicate phases of the demodulation signal. Each demodulation signal R×C and R×D is expressed as a sum of the inphase component (I) and the quadrature component (Q) as follows. The phase difference of the reception signal of each element is calculated by adding the phase difference vectors at a plurality of sample points as shown in FIGS. 10A to 10C. It is noted in FIGS. 10A to 10C that "*" means "×."

$$R \times C \rightarrow X \times \exp(j\phi 1) = X \times (a+jb) = (X \times a) + j(X \times b) \quad (3)$$

$$R \times D \rightarrow Y \times \exp(j\phi 2) = Y \times (c+jd) = (Y \times c) + j(Y \times d) \quad (4)$$

In the above equations (3) and (4), a+jb and c+jd are unit vectors, respectively. By substituting the equations (3) and (4) into the equation (2), the inphase component DefI and the quadrature component DefQ are expressed as follows (see FIG. 10A), respectively.

$$DefI = (X \times a) \times (Y \times c) + (X \times b) \times (Y \times d) \quad (5)$$

$$DefQ = (X \times b) \times (Y \times c) - (X \times a) \times (Y \times d) \quad (6)$$

Thus, by substituting the components of each demodulation signal into the above equations (5) and (6), the phase difference vector Def can be calculated (see FIG. 10B). By adding the phase difference vectors calculated at different sample points, the composite phase difference vector SumDef is calculated (FIG. 10C). From the phase of the composite phase difference vector SumDef, the phase difference M) of each demodulation signal is calculated for calculating the direction of the obstacle P.

It thus becomes possible to accurately calculate the phase difference Δφ by combining the phase difference vectors reflecting the amplitude of the reception signal, because the phase differences having the amplitudes of the reception signal as weights can be averaged. The arrival direction θ of the reflection wave is calculated from the equation (1) based on the phase difference Δφ. The arrival direction of the reflection wave based on the reception signals of the receiving elements B and D can also be calculated in the similar manner.

The position calculation section 37 is also configured to generate position information (three-dimensional coordinate) indicating the position of the obstacle based on the calculated distance to the obstacle, the phase difference vector indicating the horizontal direction and the phase difference vector indicating the vertical direction. The position calculation section 37 transmits the position information of the three-dimensional coordinate to the ECU 2 upon request of a position information request instruction from the ECU 2.

Figure 11:
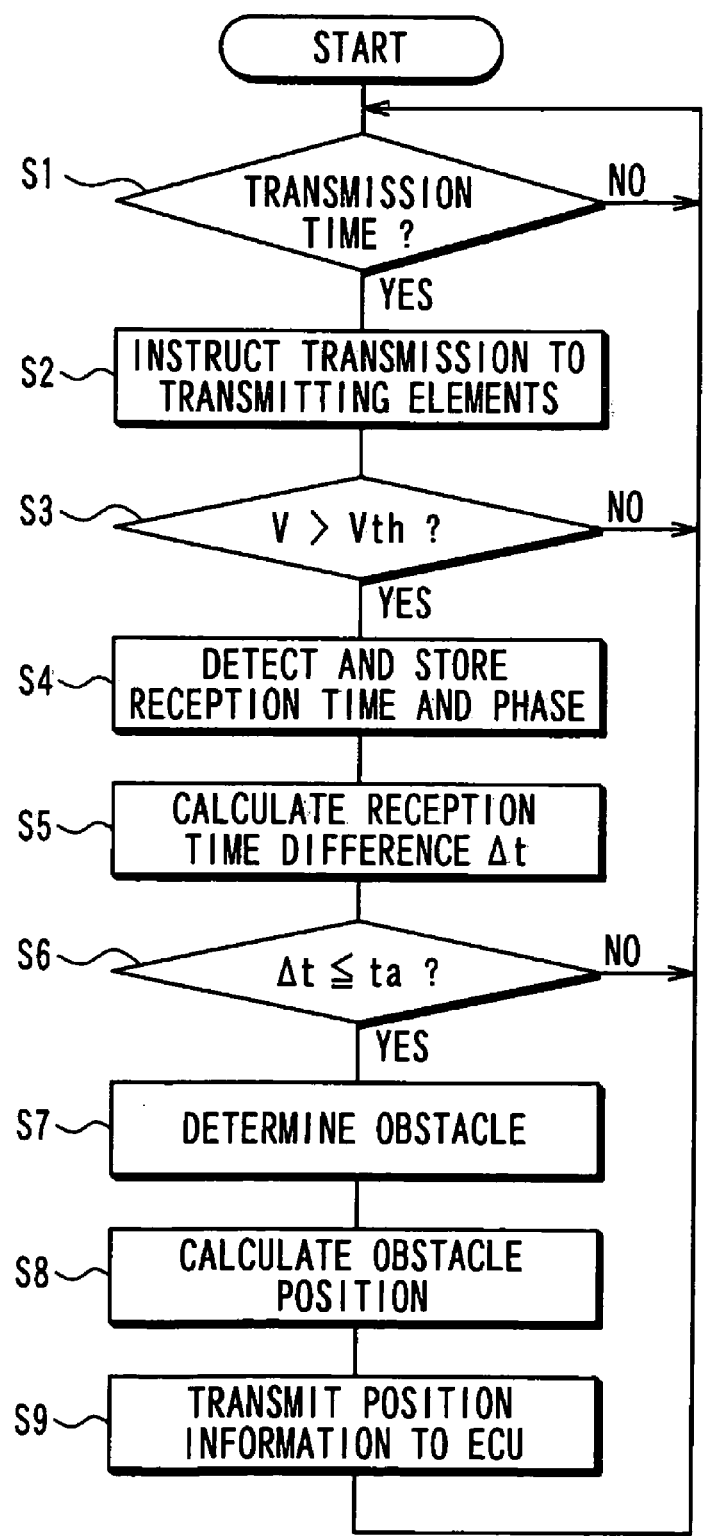
FIG. 11 is a flowchart showing obstacle detection processing executed by each ultrasonic sensor.

The obstacle detection operation executed by the CPU 2a of the ECU 2 and each ultrasonic sensor 10 to 13 is described with reference to the flowchart shown in FIG. 11. For example, the CPU 2a starts the following obstacle detection processing in response to a predetermined trigger, which may be generated when a transmission gear unit of a vehicle is geared to the reverse position R.

In each sensor 10 to 13, the transmission control section 20 checks (at step S1) whether it is time to transmit transmission wave. The transmission time may be checked by checking whether a transmission instruction is outputted from the CPU 2a of the ECU 2. This instruction is generated for the ultrasonic sensors in the predetermined sequence. If it is the transmission time (S1: Yes), the transmission control section 20 drives (at S2) the transmitting element A to transmit the ultrasonic transmission wave.

After transmitting the transmission wave, the reception control section 30 is driven to check whether the receiving elements B to D have received the ultrasonic reflection waves (reception waves). Specifically, the reception control section 30 checks (at S3) whether the reception level is in excess of the threshold level, that is, whether the reception wave includes a wave (obstacle reflection wave), which has the voltage (amplitude) greater than the threshold level Vth.

If the check result is affirmative (S3: Yes), the reception control section 30 detects (at S4) the reception time and phase of such a wave, which corresponds to the set of waves determined as having sufficient amplitude. The detected time and phase are stored in a data-rewritable memory such as a RAM. The reception control section 30 calculates (S5) the reception time difference Δt between the reception time points of the set of corresponding waves based on the reception time points stored in the memory at S4.

The reception control section 30 then checks (at S6) whether the reception time difference Δt calculated at S5 is equal to or less than the predetermined time interval ta. If the check result, is affirmative (S6: Yes), the reception control section 30 determines (at S7) that an obstacle is present. The reception control section 30 calculates (at S8) the position of the obstacle based on the phase detected at S4 and the reception time difference Δt calculated at S5. The reception control section 30 further transmits (S9) the calculated position information to the ECU 2.

According to the obstacle detection system 10 implemented as the first embodiment, it is determined that an obstacle is present based on detection of a set of waves (obstacle reflection waves), which have amplitudes (voltages) V higher than the threshold level Vth and attain the threshold levels within the predetermined time interval ta between the receiving elements. Therefore, it is not necessary to perform the transmission of the transmission wave and the reception of the reflection wave a plurality of times, and hence it is possible to improve the response time required from the transmission of the transmission wave to the determination of the presence of obstacle.

Second Embodiment

Figure 12:
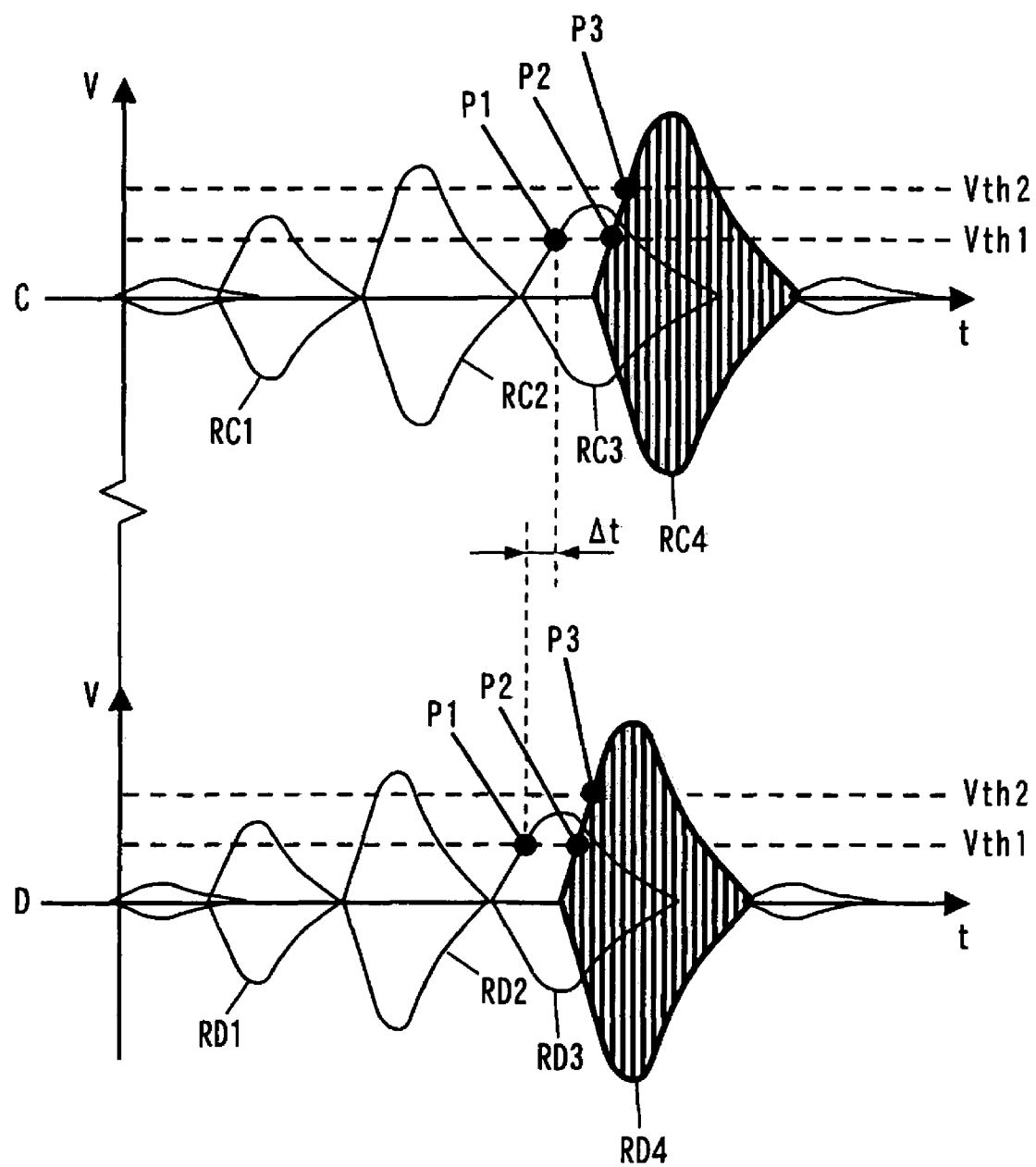
FIG. 12 is an explanatory diagram showing a relation between a reflection wave and two threshold levels in a second embodiment of the present invention.

An obstacle detection system according to the second embodiment is characterized in that a reflection wave is compared with a plurality of threshold levels as shown in FIG. 12 to enhance accuracy of obstacle determination.

It is likely that a reflection wave from an obstacle and reflection waves from other than the obstacle partly overlap. This overlapping will be caused for instance when the receiving element is close to the obstacle. In the example of FIG. 12, a reflection wave (reflection wave from an obstacle) RC4 and reflection waves (extraneous waves from other than the obstacle) RC3, which are received by the receiving element C, form a single wave, which is a combination of the reflection waves RC3 and RC4. Similarly, a reflection wave (reflection wave from an obstacle) RD4 and reflection waves (extraneous waves from other than the obstacle) RD3, which are received by the receiving element D, form a single wave, which is a combination of the reflection waves RD3 and RD4.

If no reflection waves overlap, that is, the reflection waves RC4 and RD4 are received separately from the waves RC3 and RC4, respectively, the amplitude V of each of the reflection waves RC4 and RD4 exceeds a predetermined threshold level Vth1 at a time point P2, at which the extraneous wave RC3 and RD3 have already diminished, for example. As a result, it is determined that an obstacle is present when a time difference Δt between two reception time points P2 is less than the predetermined time interval ta. If the reflection waves overlap as shown in FIG. 12, each of the reflection waves RC4 and RD4 exceeds the predetermined threshold level Vth1, while the extraneous reflection waves RC3 and RD3 are still being received. That is, the time points P2 are within the waveform of RC3 and RD4 as shown in FIG. 12. As a result, it is not possible to detect the time point P2 and hence not possible to determine the presence of an obstacle based on the time difference Δt between two reception time points P2.

If the reflection waves RC3 and RD3 exceed the threshold level Vth1 at time point P1 and further the reception time difference Δt exceeds the predetermined time interval ta, it is determined that no obstacle is present. Although an obstacle is actually present, it is likely to be determined that no obstacle is present because of overlap of the reflection waves.

Therefore, in the second embodiment, a second threshold level Vth2 is provided and set to be greater than the threshold level Vth1. If it is determined that no obstacle is present based on the detection of a set of corresponding waves, which exceed the threshold level Vth1, it is further checked whether the set of corresponding waves are higher than the second threshold level Vth2. If this check result is affirmative, it is determined that the obstacle is present.

In the example of FIG. 12, the waves RC4 and RD4, which are one set of the corresponding waves exceed the second threshold level Vth2 at time points t3, respectively. As a result, if the time difference Δt between time points P3 of the reception time P3 of the receiving elements C and D is less than the predetermined time interval ta, it is determined that an obstacle is present.

According to the obstacle detection system implemented as the second embodiment as described above, it is possible to reduce erroneous determination, which is caused by overlap of the obstacle reflection wave and extraneous waves, that no obstacle is present in spite of actual presence.

Third Embodiment

Figure 13A:
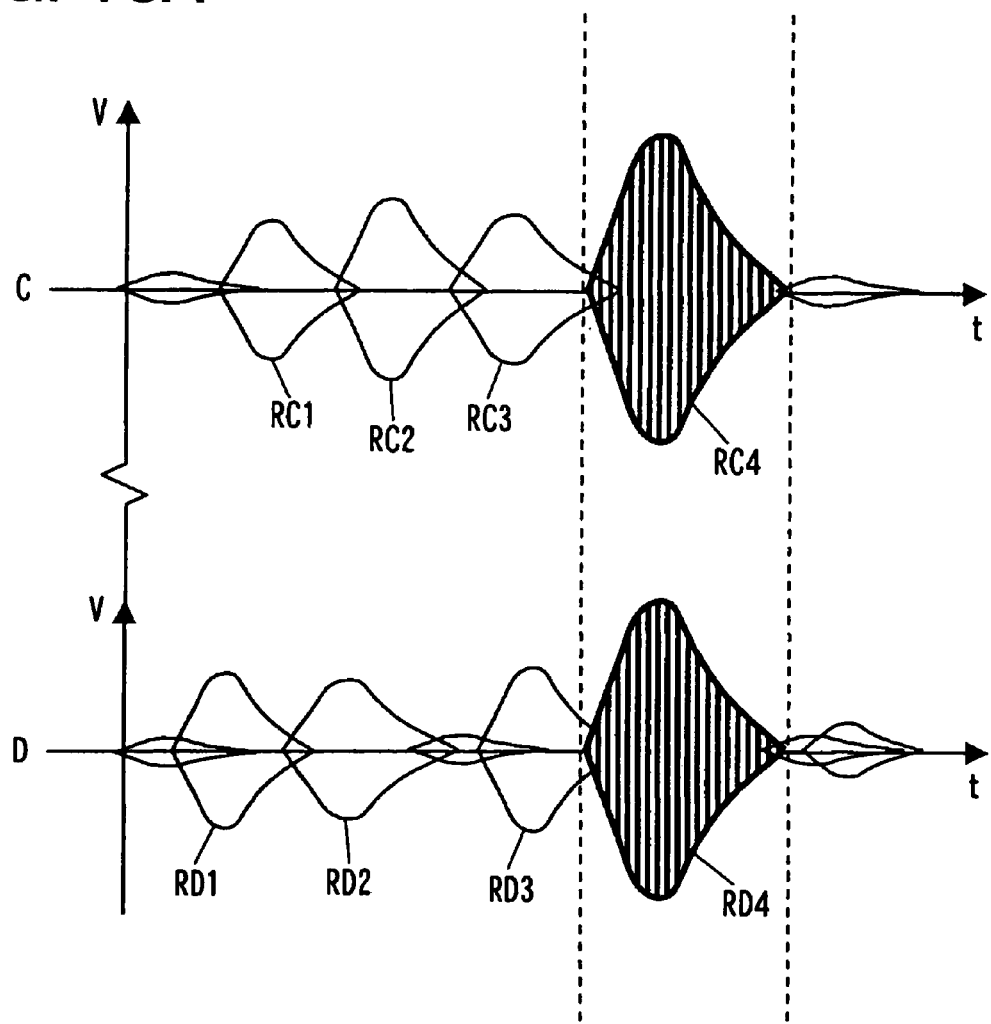
FIG. 13A is an explanatory diagram showing a reflection wave received by two receiving elements in a third embodiment of the present invention.
Figure 13B:
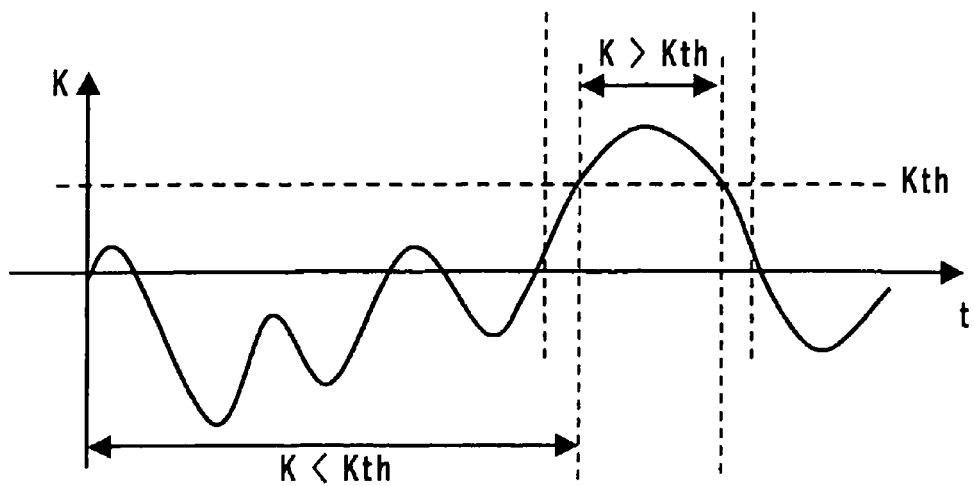
FIG. 13B is a graph showing changes in a coefficient of correlation.

An obstacle detection system according to the third embodiment is characterized in that an obstacle is detected based on a coefficient of correlation between reflection waves received by two receiving elements. Reflection waves received by two receiving elements, for example C and D, are shown in FIG. 13A, and the coefficient of correlation between the waves shown in FIG. 13A is shown in FIG. 13B.

The coefficient of correlation K between signals x(t) and y(t) is generally calculated by using the following equation (7), in which xi and yi are discrete data with "i" being variable from "1" to "n," and "$\bar{x}$" and "$\bar{y}$" are arithmetic averages of xi and yi, respectively.

$$K = \sum_{i=1}^{n} \{(xi-\bar{x})(yi-\bar{y})\} \bigg/ \left\{ \sqrt{\sum_{i=1}^{n}(xi-\bar{x})^2} \sqrt{\sum_{i=1}^{n}(yi-\bar{y})^2} \right\} \quad (7)$$

If the calculated coefficient K is positive, the signals are determined to have a positive correlation. If the calculated coefficient is negative, the signals are determined to have a negative correlation. If the calculated coefficient K is zero, the signals are determined to have no correlation. Therefore, if the amplitude (voltage) of the reception wave of one receiving element increases under the condition of positive correlation, the amplitude of the reception wave of the other receiving element also increases. If the amplitude (voltage) of the reception wave of one receiving element increases under the condition of negative correlation, the amplitude of the reception wave of the other receiving element decreases.

As understood from an example of FIG. 13A, the reflection waves from the same obstacle will be received by each receiving element at generally the same time and in generally the same waveform. In this case, the coefficient of correlation K between the amplitudes of the reception waves received by the receiving elements increases. The reflection waves from the irregular reflection body such as a road surface will be received by each receiving element at generally different time and in generally different waveform.

As a result, as shown in FIG. 13B, the coefficient of correlation K of each reception wave becomes greater when each receiving element receives the reflection wave of the same obstacle than when each receiving element receives the reflection wave of the irregular reflection body. Specifically, the set of waves having greater coefficient of correlation corresponds to the set of waves having less difference in reflection reception times between the receiving elements.

In the third embodiment, therefore, the coefficient of correlation K is used to detect the set of waves, which have the reflection wave reception time difference between the receiving elements shorter than the predetermined time interval. More specifically, the coefficient of correlation K of the reception wave of each receiving element is calculated at every predetermined time interval, and it is checked whether the calculated coefficient of correlation K is equal to or greater than a predetermined value Kth. If the check result is affirmative (K>Kth), it is determined that an obstacle is present.

As described above, according to the obstacle detection system implemented as the third embodiment, the present of an obstacle can be determined by calculating the coefficient of correlation K of the reception wave of each receiving element at every predetermined time interval and detecting the set of waves having the calculated coefficient of correlation exceeding the predetermined threshold value.

The third embodiment may be modified as follows.

It is possible to determine that an obstacle is present if the predetermined set of corresponding waves is detected. The predetermined set of corresponding waves is defined as the reception waves of the receiving elements, which has amplitudes V higher than the threshold level Vth and wave reception time difference $\Delta t$ less than the predetermined time interval ta and the coefficient of correlation K greater than the predetermined threshold value Kth. According to this obstacle determination method, the accuracy of determination can be enhanced than in a case of determination made based on only one of the wave reception time difference $\Delta t$ and the coefficient of correlation K.

The method of obstacle determination based on the detection of the set of waves having the coefficient of correlation K greater than the predetermined threshold value Kth can be an alternative to the method of obstacle determination based on the detection of the wave reception time difference $\Delta t$ between the receiving elements shorter than the predetermined time interval ta. It is however more preferred to detect the set of waves which have the reception time difference $\Delta t$ shorter than the predetermined time interval ta by directly measuring the wave reception time of each receiving element.

For this reason, it is possible to increase the accuracy in the obstacle determination by detecting the set of waves having the wave reception time difference $\Delta t$ shorter than the predetermined time interval ta as well as the set of waves having the coefficient of correlation K greater than the predetermined threshold Kth, and by giving greater weight to the former detection result than to the latter detection result. In this instance, the former detection result and the latter detection result are multiplied by a greater coefficient of weight and a less coefficient weight, respectively, and the weighted detection result are added. The presence of an obstacle is determined if the addition result exceeds a predetermined threshold value.

Fourth Embodiment

An obstacle detection system according to the fourth embodiment is characterized in that the amplitudes of reception waves of receiving elements are added by synchronizing the amplitudes with respect to time and the presence of an obstacle is determined if a set of waves, the sum of amplitudes of which exceeds a threshold value, is detected.

Since a reflection wave from the same obstacle is received at substantially the same time by the receiving elements, that is, substantially synchronized, the sum of the amplitudes of the reception waves of the receiving elements become greater. Reflection waves from an irregular reflection body such as a road surface are received at different time by the receiving elements, and hence the sum of the amplitudes of the reception waves of the receiving elements becomes less.

As a result, the sum of the amplitudes of the reception waves received by the receiving elements is greater when the reception waves are from the same obstacle than when the reception waves are from the irregular reflection body. That is, the reflection waves, which provide a large sum of amplitudes, is the set of waves, the difference in reflection wave reception times of which is small.

Therefore, in the fourth embodiment, the set of waves, which provide the reflection wave reception time difference between the receiving elements smaller than a predetermined time interval is detected by using the sum of amplitudes of the reception waves. Specifically, the amplitudes of the reception waves of the receiving elements provided at the same time are added and the sum is compared with the threshold value. It is determined that an obstacle is present if the sum exceeds the threshold value.

As described above, according to the obstacle detection system implemented in the fourth embodiment, the presence of an obstacle is determined by synchronously adding the amplitudes of the reception waves received by the receiving elements and detecting the set of reflection waves, which provide the sum greater than the threshold value.

The fourth embodiment may be modified as follows.

It is possible to determine that an obstacle is present, when the set of waves having amplitudes V exceeding the threshold level Vth and having the reflection wave reception time difference $\Delta t$ from the corresponding reflection wave less than the predetermined interval ta but also the set of waves having the sum of amplitudes exceeding the threshold value is detected. According to this determination method, the presence of an obstacle can be determined with higher accuracy than when it is determined with only one of the reception time difference and the sum of amplitudes.

The method of determining the presence of an obstacle based on the detection of a set of reflection waves, the sum of which is greater than the threshold value, is an alternative to the method of determining the presence of an obstacle based on the detection of a set of reflection waves, the reflection wave time difference $\Delta t$ of which is less than the predetermined interval ta. However, the latter method, which uses the reception wave reception time difference, has higher accuracy than the former method.

It is therefore possible to further enhance the accuracy of determination of the presence of an article by detecting a set of reflection waves providing the reception time difference $\Delta t$ between the receiving elements less than the predetermined interval ta, detecting also a set of reflection waves providing the sum of amplitudes greater than the predetermined value, and giving a higher weight to the former detection result than to the latter detection result. For example, the former detection result and the latter detection result may be multiplied by a greater weight and a less weight, respectively, and the products of the multiplication are added. It is determined that an obstacle is present if the sum exceeds a threshold value.

Fifth Embodiment

Figure 14:
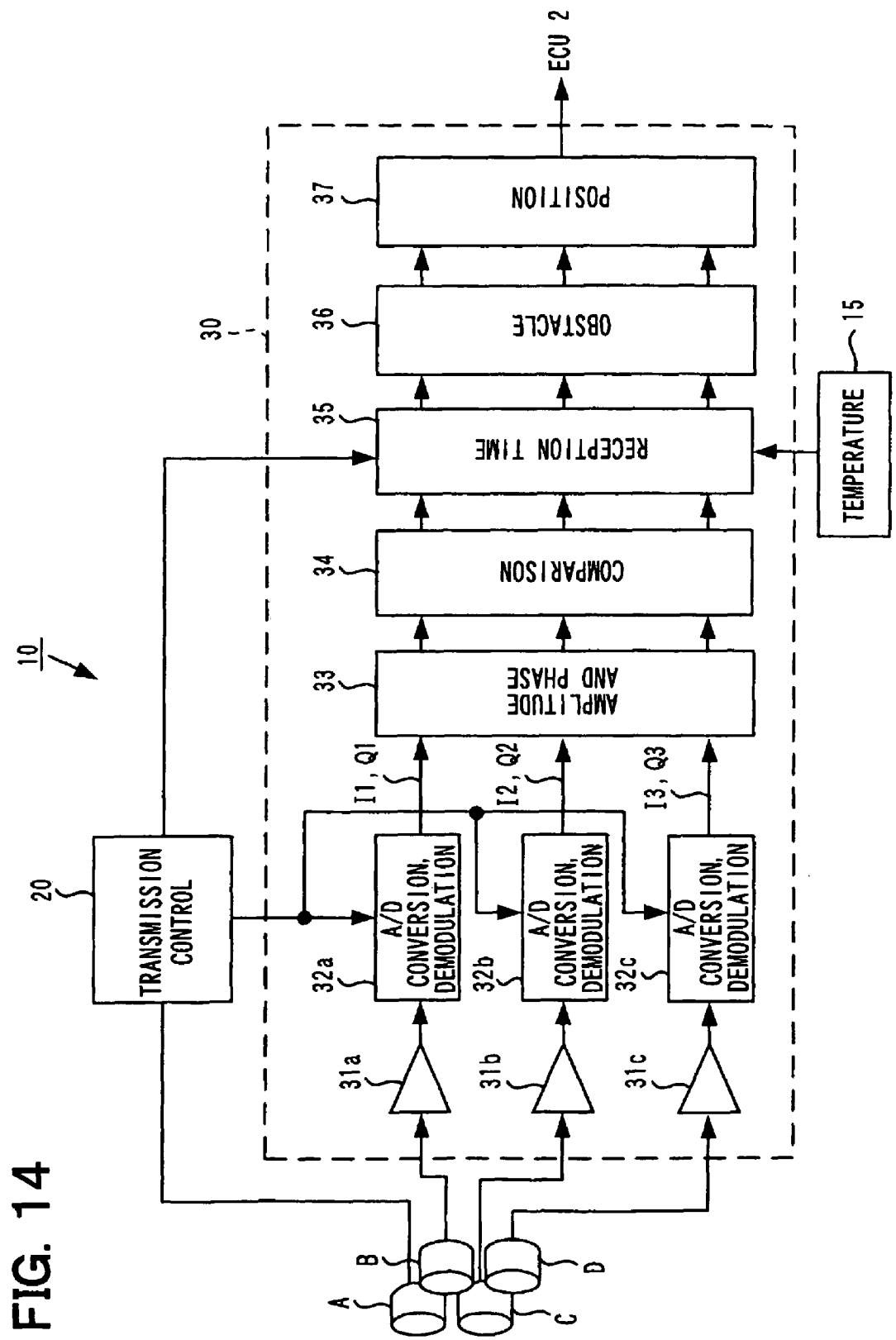
FIG. 14 is a block diagram showing a physical object detection system according to a fifth embodiment of the present invention.

An obstacle detection system according to the fifth embodiment is characterized in that a temperature sensor 15, which detects ambient temperature of each sensor, as shown in FIG. 14 in addition to the configuration shown in FIG. 6.

The speed of propagation of the ultrasonic wave transmitted from the transmitting element A varies with temperature of air, which is a medium of propagation. As a result, the wave reception time of each receiving element B to D varies with ambient temperature.

The reception time detection part 35 is configured to correct the reflection wave reception time in accordance with the ambient temperature detected by the temperature sensor 15. The obstacle determination part 36 calculates the reflection wave reception time difference $\Delta t$ between the receiving elements based on the corrected reception time.

According to the obstacle detection system 10 implemented in the fifth embodiment, even in a case that the presence of an obstacle is determined based on the distance difference $\Delta x$ in place of the reception time difference $\Delta t$, the accuracy of determining the presence of an obstacle can be enhanced without being influenced by ambient temperatures by correcting the sound velocity and hence the distance Δx by the detected ambient temperature.

Other Embodiments (1) In each of the foregoing embodiments, the element A and the elements B to D, which are used as the transmitting element and the receiving elements, respectively. However, each of the elements A to D may be used in different way as the case may be. Each element A to D may be used as the transmitting and receiving element. For example, the element A may be used as the transmitting and receiving element, and the elements B to D may be used as the receiving elements. The horizontal direction of the physical object may be determined based on average values of each phase difference between the elements A and B and between the elements C and D. The vertical direction of the physical object may be determined based on average values of each phase difference between the elements A and C and between the elements B and D. According to this embodiment, the accuracy in detecting the position of an obstacle can be enhanced further.

(2) The ultrasonic sensors may be arranged in the vertical direction relative to the ground surface. According to this arrangement, the range of detection of an obstacle can be enlarged in the vertical direction. For example, in vehicles such as a van, bus or truck having a high roof for transporting luggage or passengers, the ultrasonic sensors may be arranged in the vertical direction in the rear corner part of the vehicle.

According to this arrangement, since the range of detection of an obstacle is widened in the vertical direction, obstacles present over the ground surface can be detected with high accuracy. For example, obstacles protruding forward from the wall surface or downward from the top ceiling of a parking garage can be detected.

(3) In place of an ultrasonic wave, electromagnetic waves such as electric wave or light may be used.

(4) A part or all of the processing executed by each sensor 10 to 13 may be executed by the ECU 2.

(5) The obstacle detection system described with reference to each embodiment may be used in a parking assisting system, which assists a driver when the driver parks the vehicle. The ECU 2 provided in the parking assisting system is connected to a memory section for storing the position of the ultrasonic sensor and to a travel condition acquisition section. The memory section is provided for storing the positions of attachment of the ultrasonic sensors 10 to 13.

The memory section stores the three dimensional coordinates and the position of attachment of the ultrasonic sensor. The three-dimensional coordinate system has its point of origin at the central point of the vehicle. The travel condition acquisition section acquires travel conditions, which indicate the travel speed and direction of the vehicle at respective time, based on the outputs of the vehicle speed sensor, terrestrial magnetism sensor, gyroscope and steering angle sensor.

The CPU 2a of the ECU 2, in detecting an obstacle, stores in the RAM 2c a trajectory of movement of a vehicle as a function of time based on the travel condition acquired from the travel condition acquisition section. It also converts the position information about the obstacle transmitted from each reception control section 30 into position information, which is referenced to the center of the vehicle, and stores it in the RAM 2c. The position information of the obstacle is thus converted into the position information relative to the center of the vehicle as a reference, so that a plurality of position information acquired from the ultrasonic sensors 10 to 13 may be processed together.

The position information of the obstacle stored in the RAM 2c in correspondence to each time is converted to the position, which references to the present position, based on the trajectory of movement of the center of the vehicle stored in the RAM 2c. The CPU 2a recognizes the position information detected at each time with reference to the present time and the present position. Thus, the shape of the obstacle can be recognized based on the plurality of position information of the obstacle detected, during travel of the vehicle.

For example, a rod-shaped obstacle is calculated as one point and recognized as the rod-shaped obstacle. A plane-shaped obstacle is calculated as different points as the vehicle moves and recognized as the plane-shaped obstacle. For example, for searching for a space for parking a vehicle in tandem or in series, a space available for such a tandem or series parking can be searched for by detecting the shape of a parking vehicle. Further, for searching for a space for parking a vehicle in parallel, availability of a parking space and a target parking position setting in automatic parking can be determined by detecting the shape of a parking vehicle and the space available for parking.

The physical object detection system is implemented as the obstacle detection system for vehicles in the above embodiments, it may be used for robots. Obstacles, which obstruct operation of a robot, can be detected with high accuracy over a wide range by arranging ultrasonic sensors on, for example, arms, legs, head, body and the like of a robot, which may be any of biped walking robot, industrial robot and the like.

What is claimed is:

1. A physical object detection system comprising:
at least one transmitting element for transmitting a transmission wave;
at least two receiving elements for receiving a reflection wave, which corresponds to the transmission wave reflected by a physical object; and
an electronic unit for detecting presence of the physical object based on a phase difference between the reflection waves received by the receiving elements,
wherein the electronic unit includes:
a detection section configured to detect a set of waves, each of which is a part of the reflection wave received by each of the receiving elements and has an amplitude greater than a predetermined level, a time difference between time points at which the amplitudes of the set of waves exceed the predetermined level is less than a predetermined time interval; and
a determination section configured to determine presence of the physical object when the set of waves are detected between the receiving elements, and
wherein:
the detection section is configured to detect the set of waves, if the amplitudes of the set of waves are greater than a first predetermined level but the time difference between time points at which the amplitudes exceed the first predetermined level is greater than the predetermined time interval, by checking whether the amplitudes of the set of waves are greater than a second predetermined level greater than the first predetermined level, and the time difference between time points at which the amplitudes exceed the second predetermined level is less than the predetermined interval; and
the determination section is configured to determine the presence of the physical object when the set of waves having the amplitudes greater than the second predetermined level and the time difference is less than the predetermined time interval.

2. The physical object detection system according to claim 1, wherein:
the determination section is configured to determine that the physical object is an irregular reflection body, which reflects the transmission wave irregularly, when the detection section detects a set of waves, each of which is a part of the reflection wave received by each of the receiving elements and has an amplitude greater than the predetermined level, a time difference between time points at which the amplitudes of the set of waves exceed the predetermined level is greater than the predetermined time interval.

3. The physical object detection system according to claim 2, wherein:
the determination section is configured to determine that the irregular reflection body is one of a road surface, a net structure and a tree.

4. The physical object detection system according to claim 1, wherein:
the time difference corresponds to a difference in distances caused between the receiving elements in respect of distances relative to the physical object.

5. The physical object detection system according to claim 1, wherein:
the detection section is configured to detect the set of waves by comparing a distance difference calculated based on the time difference and a propagation velocity of the transmission wave with a predetermined distance.

6. The physical object detection system according to claim 5, wherein:
the predetermined distance corresponds to a positional interval between the receiving elements.

7. The physical object detection system according to claim 1, further comprising:
a temperature sensor for measuring an ambient temperature,
wherein the transmission wave is an ultrasonic wave, and
wherein the detection section is configured to correct the time difference in accordance with the ambient temperature measured by the temperature sensor.

8. The physical object detection system according to claim 5, further comprising:
a temperature sensor for measuring an ambient temperature,
wherein the transmission wave is an ultrasonic wave, and
wherein the detection section is configured to correct the propagation velocity of the transmission wave in accordance with the ambient temperature measured by the temperature sensor.

9. The physical object detection system according to claim 1, wherein:
the transmitting element, the receiving elements and the electronic unit are mounted on a vehicle.

* * * * *